United States Patent [19]
Glasser et al.

[11] Patent Number: 5,102,992
[45] Date of Patent: Apr. 7, 1992

[54] METHOD OF PRODUCING PREPOLYMERS FROM HYDROXYALKYL LIGNIN DERIVATIVES

[75] Inventors: Wolfgang G. Glasser; Willer De Oliveira, both of Blacksburg, Va.; Stephen S. Kelley, Kingsport, Tenn.; Li S. Nieh, Mississippi State, Miss.

[73] Assignees: Center for Innovative Technology, Herndon; Virginia Polytechnic Institute and State University, Blacksburg, both of Va.

[21] Appl. No.: 569,550

[22] Filed: Aug. 20, 1990

Related U.S. Application Data

[62] Division of Ser. No. 460,989, Jan. 4, 1990, which is a division of Ser. No. 183,213, Apr. 19, 1988, Pat. No. 4,918,467.

[51] Int. Cl.$^5$ .......................... C07G 1/00; C08L 97/00
[52] U.S. Cl. ..................................... 530/502; 527/400
[58] Field of Search ........................ 530/502; 527/400

[56] References Cited

U.S. PATENT DOCUMENTS 3,546,199  12/1970  Christian et al. .................. 530/500
3,905,926   9/1975  D'Alelio .............................. 530/502

OTHER PUBLICATIONS

Glasser et al, "Engineering Plastic from Lignin", J. Applied Polymer Science, vol. 29, 1815–1830 (1984).

*Primary Examiner*—Nathan M. Nutter
*Attorney, Agent, or Firm*—Kenyon & Kenyon

[57] ABSTRACT

A method of producing prepolymeric materials from lignin is disclosed. The method uses lignin which has been hydroxyalkyl modified, such that the lignin is substantially non-phenolic and solvent soluble and/or liquid. The modified lignin is reacted with materials which yield prepolymers which may be polymerized according to known methods to produce useful polymers.

3 Claims, 2 Drawing Sheets

5,102,992

METHOD OF PRODUCING PREPOLYMERS FROM HYDROXYALKYL LIGNIN DERIVATIVES

This application is a division of application Ser. No. 07/460,989, filed Jan. 4, 1990 which is a division of Ser. No. 07/183,213, filed Apr. 19, 1988 and now U.S. Pat. No. 4,918,467.

FIELD OF THE INVENTION

The present invention relates to methods of producing prepolymers from hydroxyalkyl lignin derivatives and the prepolymers produced thereby.

BACKGROUND OF THE INVENTION

It has long been an object of chemists to extract and commercially utilize the lignin recovered from natural ligno-cellulose materials such as wood. This objective has been highlighted in recent years with the public cognizance of an energy shortage. Climbing prices for oil and natural gas have drawn attention and effort to methods of exploiting the lignin ingredient of wood as a source of plastics feed stock.

Lignin, which is a by product of the pulp and paper industry, is available in large quantities. Because of its complex nature and complicated chemical structure, however, it has not been considered as a valuable chemical intermediate.

Presently, lignin is used almost exclusively as fuel to power the evaporators of the chemical recovery processes and liquor concentration systems of pulpmills. Applicants share the belief of other lignin chemists that lignin can achieve a higher value as industrial raw material than as a fuel.

First, lignin may assume a role as "feed stock" for low molecular weight materials such as phenols which are base chemicals of many products. However, a competitive advantage of lignin over some petroleum or other fossil materials would be best insured by converting it into polymeric materials which retain lignin's structural characteristics. Secondly, polymer modification, rather than breakdown and resynthesis, appears to be another promising approach to the utilization of lignin. Fertilizers, ion exchange resins, and polyurethane products, to name a few, are candidates for such lignin outlets. A third possibility presents itself through a rapidly developing microbiological engineering technology, which views lignin as a natural "protein-precursor". Finally, lignin may also be viewed as a valuable component of high yield pulp.

Lignin is the second most abundant substance in wood, exceeded only by cellulose. It occurs in amounts ranging from 20 to 35% of natural wood content depending on the species, as well as in other parts of the tree such as leaves, shoots, stalks, branches, trunks, and roots. Lignin is thought of as a light brown amorphous "cement" that fills the gaps between the long, thin polysaccharide fibers in the cell walls and binds them together. The role of lignin in gluing the plant fibers together can be compared to that of the polyester resin which is used to strengthen the fiberglass webbing of an automobile body.

Paper producers use various alkaline and/or acid chemicals to dissolve lignin and to liberate the fibers for papermaking. For them, the lignin is an undesirable wood component.

Presently, there are two main methods in use for removing lignin from wood, the sulfite process and the kraft process. In the sulfite process, the wood is cooked with various salts of sulfurous acid. In the kraft process, wood is cooked with a solution containing sodium hydroxide and sodium sulfide. The dark solutions of the degraded lignin which are dissolved out from the wood are commonly known as "spent sulfite liquor" in the sulfite process, and "black liquor" in the kraft process. These spent pulping liquors are usually concentrated for use as fuel, and for the recovery of certain pulping chemicals.

Lignin may be produced in ways other than the sulfite and kraft processes. These biomass-to-chemicals conversion processes include process schemes based on the involvement of mineral acid (acid hydrolysis lignin, AHL), water and steam at various temperatures and pressures (autohydrolysis and steam explosion lignin, SEL), and organic solvent mixtures, such as ethanol and water (organosolv lignin, OSL). Milled wood lignins (MWL) constitute laboratory preparations isolated by extensive mechanical ball milling of solvent extracted sawdust, and subsequent lignin extraction and purification. MWLs are presumed to be closely representative of native lignins in wood.

The unique chemical and physical properties of the lignin-derived polymer has given it a place among specialty polymer applications such as dispersants emulsifiers and binders. For these purposes a part of the lignin is recovered from the spent pulping liquors. The reduction in heat value of these liquors is thereby made up with other fuels.

The previously somewhat limited commercial utilization of lignin is occasioned principally by its physical and chemical characteristics. For example, lignin is not resistant to water and is soluble in alkaline solutions. Moreover, lignin is a nonthermosetting thermoplastic which tends to disintegrate if heated above 200° C. and which, if formable at all from the amorphous powdered condition in which it is recovered, merely provides a crumbly mass of little or no strength.

As can easily be extracted from the foregoing one of the goals in lignin chemistry is to develop alternate uses for lignin whereby this unique renewable natural polymer can be disposed of more profitably than presently occurs.

Lignin is composed of carbon, hydrogen and oxygen in different proportions. Its basic building units are phenylpropanes which are interconnected in a variety of ways by carbon-carbon and carbon-oxygen bonds, giving lignin a complicated three-dimensional structure. The molecular weight of lignin varies with its method of isolation, and its source. Lignin from a sulfite pulping process generally has an average molecular weight of about 20–100 thousand Lignin from kraft pulping processes on the other hand has a lower average molecular weight which ranges from 1.5–5 thousand Another characteristic of lignin is that the number of hydroxyl groups (and especially of phenolic hydroxyl groups) per given weight increases as the molecular weights of the lignins decrease. Because low molecular weight lignin possesses a higher percentage of phenolic hydroxyl groups, it has a higher potential to react with oxyalkylating modification reagents such as ethylene oxide, propylene oxide and others. Apart from the reactive hydroxyl sites, lignin possesses various carbonyl, carboxyl, aldehyde and ethylene groups which provide additional sites for other modification reactions.

The chemical pulping agents generally referred to above degrade lignin into a condensed spherical core polymer with reduced activity when compared with that which exists in its naturally occurring state. This is possibly due to the higher surface tension spherical form which may cause the lignin to become a difficult-to-modify material. Notwithstanding this negative factor, lignin has been used in various products because of its availability.

As alluded to above, in general plastics applications, there are two possible ways to utilize lignin. Firstly, lignin may be degraded into low-molecular weight compounds commonly referred to as feed stocks and then reconverted to various synthetic polymers. Secondly, lignin may be used in its natural high-molecular weight state following suitable chemical modification. Such modifications may utilize and act upon any one of the many functional groups present in the complex lignin polymer.

While these general approaches appear simple, they are complicated in both application and intended result.

One method of treating lignin in order to make a potentially useful product involves forming lignin-based epoxides. In the past, such epoxides have been formed by reacting unmodified (phenolic), or phenolated (phenol-enriched) lignin with epichlorohydrin in aqueous alkali. See, e.g., U.S. Pat. Nos. 3,905,926 and 3,984,363 and references to work by Tai et al., Mokuzai Gakkaishi 13 (1967) 257-262. However, the epoxides produced by such reactions possess exceedingly poor solubility, which greatly hinders their commercial utility. Accordingly, it would be useful to develop a method of producing a lignin-based epoxide that exhibits good solubility.

Unmodified (phenolic) lignins have also been treated with methacrylates. See, e.g., Naveau, "Methacrylic Derivatives of Lignin," Cellulose Chemistry and Technology 9: 71-77 (1975). However, poor solubility characteristics of the lignin adducts with methacrylic anhydride or methacrylyl chloride limit their ability for copolymerization with vinyl monomers, and this hinders their commercial utility. Accordingly, it would be useful to develop a method of producing a lignin-based methacrylic and derivative that exhibits good solubility.

Hydroxyalkylation of lignin has been recognized as a promising technique for overcoming lignin's poor solubility and its frequently observed adverse effects on mechanical properties of solid polymers and on viscosity and cure rare of resin systems. Chemical modification by oxyalkylation has been demonstrated to offer a route to improving solubility, to reducing the brittleness of lignin-derived polymers, and to improving viscoelastic properties in various end uses. Oxyalkylation results in a copolymer combining covalently high modulus lignin with a lower modulus alophatic polyether phase.

The hydroxyalkylation reaction of various types of lignin and lignin analogs (tannins, etc.) with 1,2-oxides, 1,2-carbonates, and 1,2-sulfites has been accomplished with or without catalyst (alkali metal or alkali earth metal hydroxide or carbonate); at temperatures between 20° C. and 250° C; in the presence or absence of a solvent; with reactive (alcohols, amines) or unreactive (benzene, chlorobenzene) solvents; and in weight ratios between lignin and oxyalkylating agent between 3:1 and 1:100. See e.g., U.S. Pat. Nos. 3,476,795 and 3,546,199. The formation of liquid polyhydroxy compounds (polyols) from lignin and carboxylated (by reaction with maleic anhydride) lignin derivatives has been achieved batchwise at temperatures in excess of 180° C. See U.S. Pat. No. 4,017,474. Another approach employs reaction conditions involving incremental addition of alkylene oxides to the heated and stirred reactor content such that the reaction pressure is maintained at about 50 psig. See U.S. Pat. No. 3,546,199. Tarry polyols produced by batch reaction at temperatures above 180° C. have recently been fractioned analytically and preparatively into liquid alkylene oxide homopolymers and solid copolymers with lignin contents of around 60%.

SUMMARY OF THE INVENTION

The present invention relates to methods of preparing prepolymers having multiple functionality comprising treating non-phenolic hydroxyalkyl lignin derivatives with a prepolymer-forming agent. The hydroxyalkyl lignin derivatives may be prepared from kraft, organosolv, and/or steam explosion lignin.

In one preferred embodiment of the invention, the resulting prepolymer is an organic solvent soluble and/or liquid epoxy resin synthesized by treating a hydroxyalkyl lignin derivative dissolved in a polar aprotic organic solvent with epichlorohydrin in the presence of alkali metal hydroxide and an optional catalyst (phase transfer agent, quaternary ammonium salt). The method preferably involves step-wise addition of alkali to the reaction medium.

In another preferred embodiment of the invention, hydroxyalkyl lignin derivatives are used to synthesize organic solvent soluble and liquid acrylates by treating the lignin derivatives with an acrylating agent such as isocyanato ethyl methacrylate (Dow Chemical USA, Midland, Mich.), meta-TMI (American Cyanamid Company, Wayne, New Jersey; synonyms: benzene, 1-(1-isocyanato-1-methylethyl)-3-(1-methylethenyl); a,a-Dimethyl metaisopropenyl benzyl isocyanate), methacrylyl chloride or methacrylic anhydride, and isolating the acrylated derivative in solid or viscous liquid form.

In yet another preferred embodiment of the invention, a hydroxyalkyl lignin derivative is treated with a suitable capping agent, such as a dialkyl sulphate, alkylene halide, or monoisocyanate, followed by a chain extension reaction with an alkylene oxide under non-aqueous conditions using a suitable alkaline catalyst in combination with an optional phase transfer agent. The resulting product is a star-like macromer.

Other details, objects and advantages of the invention will become apparent as the following description of the presently preferred embodiments and presently preferred methods of practicing the invention proceeds.

BRIEF DESCRIPTION OF THE DRAWINGS

In the accompanying drawings, the preferred embodiments of the invention and preferred methods of practicing the invention are illustrated in which:

FIG. 3 illustrates schematically the reaction pathway to the production of (ethylether-capped) star-like macromers from lignin and propylene oxide according to the present invention.

DETAILED DESCRIPTION OF THE INVENTION

Epoxy resins are relatively expensive materials (ca. $1.25–2.50/lb) used in the manufacture of coatings and fiber reinforced composites. In 1984, epoxy markets amounted to more than 400 million pounds/year in the United States. The fiber reinforced composites market, in particular, is expected to grow into a $10 billion business by the late 1990's according to estimates by the DuPont Company. By virtue of their chemistry, lignin-based epoxy resins are expected to be well qualified materials with good surface active and wetting properties for both polar and non-polar fibers. Prior methods of producing lignin-based epoxides have reacted unmodified (phenolic) lignin with epichlorohydrin in aqueous alkali. See, e.g., U.S. Pat. Nos. 3,984,363 and 3,905,92 Such prior methods produce products having exceedingly poor solubilities. See, e.g., the Tai et al. publication noted earlier, and U.S. Pat. No. 3,984,363, which reports solubility in DMSO, DMF, dimethylacetamide, trimethylurea, dioxane, and THF.

A preferred embodiment of the present invention relates to a method of synthesizing organic solvent soluble and/or liquid epoxy resins from alkylene oxide (i.e., ethylene oxide, propylene oxide, or butylene oxide)—modified lignin. The resulting epoxy resins are nonvolatile prepolymers with multiple functionality which can be readily crosslinked by curing with diamines or anhydrides at elevated temperature.

The synthesis method involves treatment, at room or elevated temperature, of a hydroxyalkyl lignin derivative dissolved in a polar aprotic organic solvent, with epichlorohydrin in the presence of alkali (such as NaOH, KOH, or a similar metal hydroxide). The preferred starting material for the present invention is a low molecular weight, non-sulfonated lignin, such as is produced by organosolv pulping or steam explosion treatment of hardwoods. Carboxylation, as described in U.S. Pat. No. 4,017,474, is not necessary. The presence of a suitable phase transfer catalyst, such as tricaprylylmethyl ammonium chloride, (see U.S. Pat. No. 3,992,432), or tetra-butyl ammonium chloride, or a crown ether is optional, and this enhances the rate and yield of the reaction. The solvents used may be, without way of limitation polar aprotic solvents including ketones (such as 2-butanone), esters (such as propyl and butyl acetates), glycol ether esters and polar hydrocarbons. Chloroform and methylene chloride serve satisfactorily.

Figure 1:
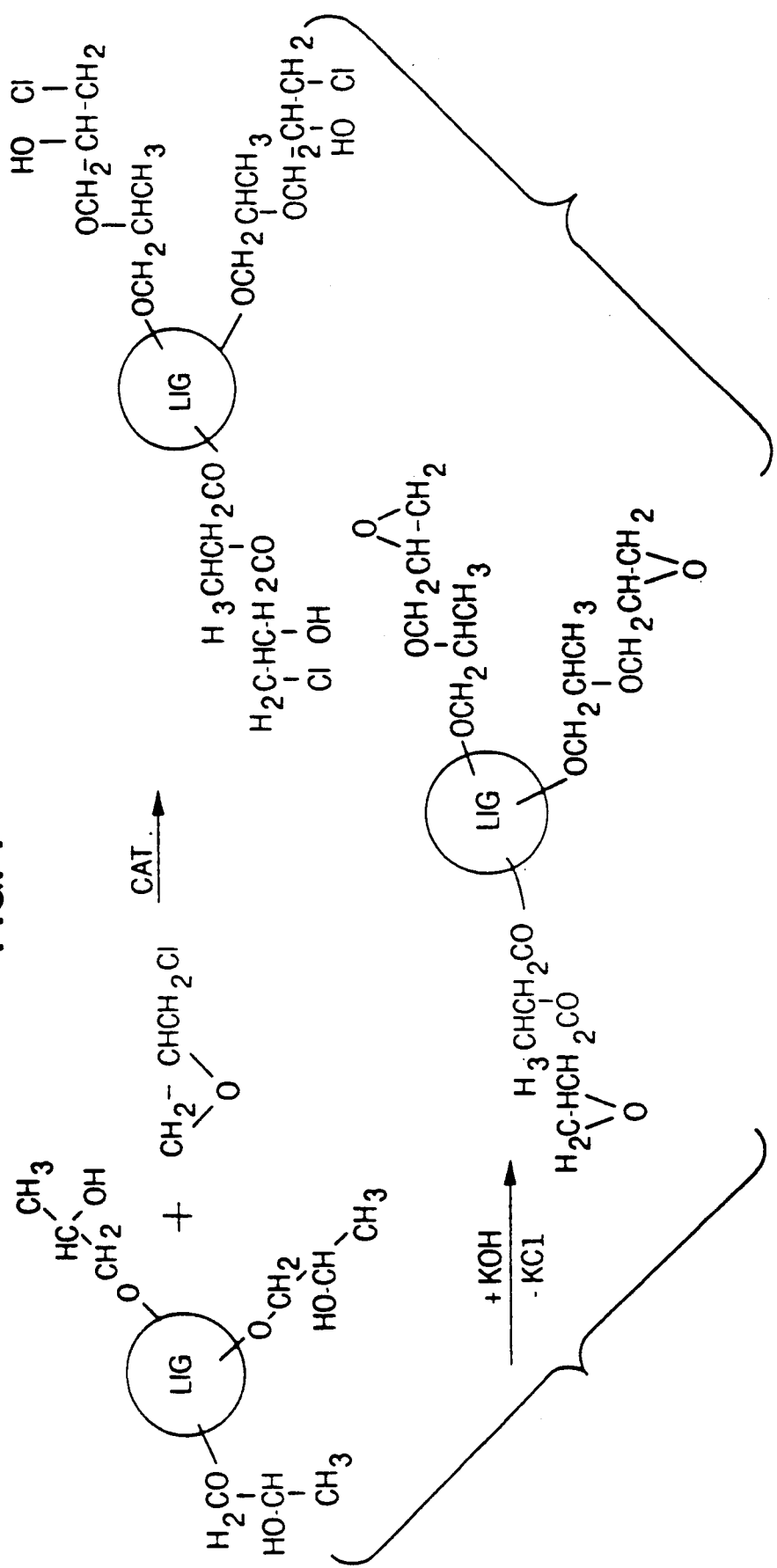
FIG. 1 illustrates schematically the chemical reaction pathway to the production of lignin epoxy resins according to a preferred embodiment of the present invention.
Figure 2:
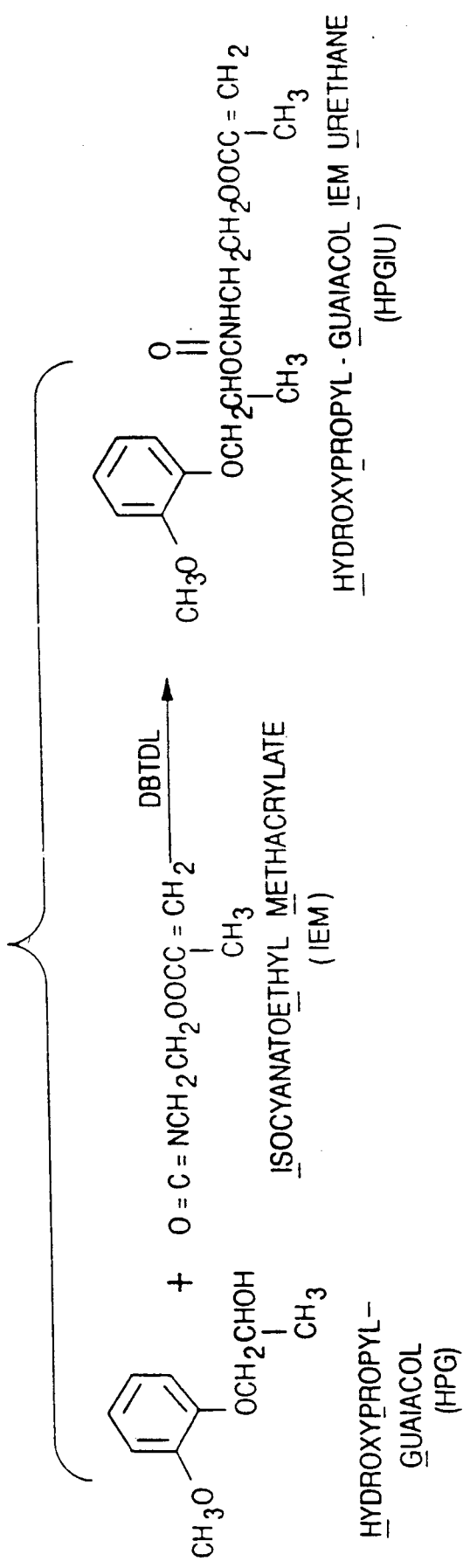
FIG. 2 depicts the analogous reaction scheme for the synthesis of a hydroxypropyl lignin-based acrylate according to a preferred embodiment of the present invention.

This lignin-based epoxy synthesis method preferably involves the reaction of a non-acidic, non-phenolic hydroxyl functionality of a hydroxyalkyl lignin derivative with epichlorohydrin and alkali under non-aqueous reaction conditions. The synthesis of hydroxyalkyl lignin has been the subject of prior work. See, e.g., U.S. Pat. No. 4,017,474. FIG. 1 illustrates a possible mechanism for the reaction, showing the chemical reaction pathway to the disclosed lignin epoxy resins. The method preferably involves the step-wise addition of alkali to the reaction medium, at a rate approximately equal to the rate of metal chloride (such as NaCl, KCl or equivalent) formation, which is produced as the reaction proceeds.

This method is applicable to any hydroxyalkyl lignin, such as one generated by reaction of ethylene oxide, propylene oxide, butylene oxide, or chain extended derivatives thereof, with epichlorohydrin. Such non-phenolic hydroxyalkyl lignin derivatives may be generated from any lignin material, such as kraft lignin, organosolv lignin, or steam-explosion lignin, by reaction with a suitable alkylene oxide such as described in U.S. Pat. Nos. 3,476,795 or 3,546,199.

The epoxy resins formed according to the present invention are different from materials produced according to prior methods in that they are (a) modestly high in molecular weight (from 500–5,000 in number average molecular weight); (b) they have multiple functionality, which qualifies them as ideal crosslinking and network forming prepolymers; (c) they are soluble in a wide range of organic solvents (such as acetone, methanol, methylene chloride, DMF, DMSO, acetonitule, and 2-butanone); and (d) they may be prepared in liquid form (i.e., a viscous tar) via choice of qualified hydroxyalkyl lignin starting material; and (e) they are prepared using non-aqueous reaction conditions with a non-phenolic lignin derivative.

The flexibility with regard to engineering properties, and the excellent solvent solubility of the prepolymers, constitute important elements of this invention. The use of non-aqueous reaction conditions in combination with a non-phenolic lignin derivative make it possible to synthesize a soluble (or liquid) lignin-based epoxy resin with multiple functionality. The catalyst (i.e. quaternary ammonium halide) is preferably subject to recycle in an industrially practicable process.

The following examples illustrate in greater detail the methods by which the production of epoxy lignins according to the present invention is carried out.

EXAMPLE 1

The following ingredients were mixed in a 3 neck round-bottom flask (500 ml): 25 g hydroxypropyl lignin (HPL) dissolved in 150 mL methylene chloride; 10 mL epichlorohydrin; 6.4 g tricaprylyl methyl ammonium chloride; 6.4 g powderous KOH. The mixture was stirred at room temperature. Another portion of 6.4 g KOH was added after 30 hours. The reaction was terminated after 144 hours by extracting the reaction mixture with water until the aqueous layer remained neutral. The collected organic solution was dried over $Na_2SO_4$ (anhydrous) and evaporated under vacuum. The residue, which was a brown solid or a viscous tar, was dissolved in acetone and dialyzed with a membrane of molecular weight cut-off of 6,000–8,000. The dialyzate had an epoxy content of 1.25 equivalents as determined by titration with hydrobromic acid in a solvent mixture of acetic acid (1 pt) and chlorobenzene (2 pts).

EXAMPLE 2

Same as example 1 except that 20 mL epichlorohydrin were added. An additional portion of potassium hydroxide (6.4 g) was added on the third day. The reaction was stopped after four days. The lignin-based epoxy derivative had an epoxy content of 1.5 equivalents.

EXAMPLE 3

Same as example 1 except that 50 mL epichlorohydrin were added. Additional portions of potassium hydroxide (6.4 g each) were added on the third and sixth day, respectively. The lignin epoxide derivative had an epoxy content of 3.75 equivalents.

EXAMPLE 4

Same as example 1 except that 100 mL epichlorohydrin were added. Additional portions of potassium hydroxide (6.4 g each) were added on the third, sixth and ninth day. The reaction was stopped on the twelfth day. The lignin epoxide derivative had an epoxy content of 3.5 equivalents.

EXAMPLE 5

Same as example 1 except that 40 mL epichlorohydrin, 7.8 g KOH, and 0.5 g tetrabutylammonium bromide were added to the HPL solution. Additional portions of KOH (7.8 g each) were added after 8 and 24 hours. The reaction was terminated after 48 hours in the usual way (See example 1). The epoxide derivative had an epoxy content of 2.9 equivalents.

EXAMPLE 6

Same as example 5 except that work-up after termination of the reaction involved decanting the mixture, washing the settlable salts with dry methylene chloride, evaporating the organic solution under reduced pressure to a highly viscous tar, redissolving the residue in a mixture of chloroform (2 pts) and acetone (1 pt), and washing this solution 4 or 5 times with dilute acid (hydrochloric or acetic) followed by water. The organic solution was dried ($Na_2SO_4$), evaporated under reduced pressure, and redissolved and re-evaporated twice. The residue was dried to constant weight under vacuum. It was a viscous syrup with an epoxy content of 2.5 to 3.5 equivalents.

EXAMPLE 7

Same as example 6 except that the mixture did not contain any amine catalyst. The final product was a viscous syrup with an epoxy content of 2.0 to 3.0 equivalents.

One disadvantage of all polymeric materials produced from lignin is their color. However, two recent patents by Westvaco (U.S. Pat. Nos. 4,454,066 and 4,184,845) have demonstrated that hydroxyalkyl lignin derivatives are unique in their positive response to a simple bleaching technique involving chlorine dioxide and hydrogen peroxide, respectively. In addition, color would be totally obscured in a carbon-filled or carbon-fiber reinforced composite material. Crosslinking, curing, and network formation of the epoxy resin of the present invention is accomplished in a manner identical to that of commercial epoxy resins.

Another preferred embodiment of the invention relates to a method of synthesizing organic solvent soluble and liquid acrylates from non-phenolic hydroxyalkyl lignin derivatives, also preferably obtained by chemical modification with alkylene oxides such as ethylene oxide, propylene oxide, and butylene oxide. These acrylated lignin derivatives are prepolymers of moderate molecular weight (500–5,000 dalton) and they are reactive intermediates for crosslinking with a variety of crosslinking agents, such as vinyl monomers, including methyl methacrylate, styrene, etc.

The invention relates to the method of treating a hydroxyalkyl lignin derivative with isocyanato ethyl methacrylate (IEM) (Dow Chemicals Co., Midland, Mich.), and the isolation of an acrylated derivative in solid or viscous liquid form. Other potential acrylation techniques involve treatment with methacrylyl chloride or methacrylic anhydride in accordance with the published literature. Crosslinking of the acrylated derivatives with vinyl monomers, or oligomers, or mixtures of both, proceeds in accordance with known state-of-the-art technology. Lignin starting materials are non-phenolic alkylene oxide modified lignins from the kraft, organosolv, or stem-explosion process of soft or hardwood. Depending on the degree of modification, and the type of alkyl substituent, the lignin derivatives may be solvent soluble solids or viscous liquids at room temperature.

The following examples illustrate in greater detail the methods by which the acrylation of hydroxyalkyl lignin derivatives is carried out.

EXAMPLE 8

Hydroxybutyl lignin (15 g) dissolved in methylene chloride (90 mL) and mixed with 4.35 g isocyanato-ethyl-methacrylate (IEM) and 150 mg dibutyltin dilaurate as catalyst was kept at 40° C. for 4 hours under a constant flow of dry $N_2$ gas. The mixture was cooled and poured into a 20-fold excess of a-hexane. The solid precipitate was collected by filtration. Its N-content was 2.01%, and this corresponds to a degree of acrylation of 37% of the hydroxyl groups (i.e., an equivalent weight of 700 g per vinyl equivalent).

EXAMPLE 9

Same as example 8 except that the amount of IEM added was 1.40 g. The N-content of the acrylated derivative was 0.63%, and the degree of acrylation amounted to 12% of the hydroxyl groups (i.e., an equivalent weight of 2300 g per vinyl equivalent).

EXAMPLE 10

Same as example 8 except that the amount of IEM added was 12.1 g. The N-content of the acrylated derivative was 3.76%, and the degree of acrylation amounted to 735 of the hydroxyl groups (i.e., an equivalent weight of 400 g per vinyl equivalent).

All acrylated hydroxyalkyl lignin derivatives were found to form homogeneous solutions in methyl methacrylate, and these solutions were polymerized by the addition of a peroxide catalyst and an accelerator (N,N-dimethyl-amiline). The solubility and miscibility (with vinyl monomers) characteristics constitute a highly desirable property unique to hydroxyalkyl lignin derivatives (See Glasser et al., J. Appl. Polym. Sci. 29 (1984), 1815).

Solvent soluble or liquid lignin prepolymers with multiple vinyl functionality (acrylates) are useful for the formation of coatings, blends, and composites of various types. Novel nonmetallic structural materials engineered to perform in given mechanical and thermal stressful environments can be engineered by employing the lignin derivatives with multiple functionality.

Yet another preferred embodiment of the invention relates to a method of synthesizing polymeric intermediates by treating an isolated hydroxyalkyl lignin derivative with a suitable capping agent, for example a dialkyl sulphate (such as dimethyl or diethyl sulphate), an alkylhalide (such as ethyl iodide or methyl chloride), or a monoisocyanate (such as methylisocyanate or n-butyl isocyanate), followed by a reaction with an alkylene oxide under non-aqueous conditions using a suitable alkaline catalyst in combination with an optional phase transfer agent. The reaction of a limited and reduced number of hydroxyl groups available on macromolecular lignin may involve various alkylene oxides, but must not be limited to these types of reagents as others may apply as well. Among them are caprolactone, pivalolactone, and oxazolene. The sequence of steps is designed to determine the number of "arms" radiating from each macromolecular lignin species; and the degree of modification with alkylene oxide or lactone determines the average length of each "arm". Depending on the chemical nature of the material, and on the material of which these arms are composed, the resulting star-like macromer may represent a viscous liquid or a thermoplastic elastomer.

This aspect of the invention also addresses the chemical modification of hydroxyalkyl (ethyl, propyl, or butyl) lignin, in this case with a sequence of capping and chain extension reactions, both of which may vary with regard to chemical type and degree. The lignin may be produced according to the kraft, organosolv, and/or steam-explosion process. Both factors, chemistry and extent of chain extension greatly influence mechanical, thermal, and solution properties of the resulting star-like macromers. These materials have utility as miscible and compatible components in thermoplastic polyblends; they are useful components for incorporation into thermosetting resins with predetermined mechanical and thermal properties; and they will yield useful thermoplastic elastomers if the dangling arms are composed of crystallizable linear segments. An advantage of the invention includes the ability to tailor-make specific chemical and physical properties of the star-like macromer, and to do this conveniently and effectively on the basis of a readily available natural material The following examples illustrate in greater detail the methods by which the capping and chain extension reactions are carried out.

EXAMPLE 11

Hydroxypropyl lignin (10 g), KOH (1.87 g), quarternary ammonium salt ("phase transfer agent") (1.87 g) (optional) and 150 mL toluene are combined in a 300 mL stirred pressure reactor. A volume of 5.0 mL of propylene oxide is added to the mixture, and the reactor is heated to 80° C. (to 150° C.). After the propylene oxide has been consumed (and, this is indicated by a drop in pressure), additional propylene oxide is charged in small intermittent portions (ca. 5 mL each), or continuously (ca. 1.5 mL/hr), so as to maintain a slight propylene oxide pressure. This may be continued until a desired level of chain extension has been achieved on the lignin derivative. The chain extended lignin derivative may be isolated and freed of propylene oxide homopolymer fractions and catalysts of liquid-liquid extraction with n-hexane/acetonitrile after removal (and recovery) of the toluene by solvent evaporation; and by liquid-liquid extraction from water/chloroform or by dialysis. The final product is a brown liquid with viscosity varying in relation to degree of chain extension.

EXAMPLE 12

Same as example 11 except that a polar aprotic solvent such as 2-butanone, alkyl acetate (propyl or butyl acetate), glycol ether ester or polar hydrocarbon serves as solvent during the reaction in place of toluene.

EXAMPLE 13

Same as example 11 except that ethylene oxide is charged to the reactor instead of (or following) propylene oxide so as to achieve the formation of more highly reactive primary hydroxyl groups.

EXAMPLE 14

Same as example 11 except that a partially-capped (with alkyl ether or carbonate) hydroxypropyl lignin derivative is employed in the chain extension reaction.

EXAMPLE 15

Same as example 11 except that 18-crown-6 ether (1.3 g) are used as optional catalyst instead of quarternary ammonium salt.

The disclosed star-like macromers are expected to find application in a vast number of different metal-replacing synthetic materials, both of thermoplastic and thermosetting nature. Among them are polyblends with common thermoplastic materials, as well as polyurethane and epoxy network materials.

Although the invention has been described in detail in the foregoing for the purpose of illustration, it is to be understood that such detail is solely for that purpose and that variations can be made therein by those skilled in the art without departing from the spirit and scope of the invention except as described by the claims.

We claim:

1. A method of preparing a prepolymer having multiple functionality comprising the steps of:
   dissolving a lignin derivative comprising an alkylene oxide modified lignin in a solvent;
   admixing an acrylating agent to the mixture in the presence of a catalyst at a temperature and pressure sufficient to react the acrylating agent and the lignin to produce an acrylated hydroxyalkyl lignin derivative; and
   removing the solvent and the remaining acrylating agent to isolate the acrylated hydroxyalkyl lignin derivative.

2. The method of claim 1 wherein the acrylating agent is selected from the group consisting of isocyanato ethyl methacrylate, methacrylyl chloride, and methacrylic anhydride.

3. The method of claim 2 wherein the prepolymer is crosslinked with a crosslinking agent.

* * * * *